(12) United States Patent
Dursteler López et al.

(10) Patent No.: US 8,089,676 B2
(45) Date of Patent: Jan. 3, 2012

(54) OPTICAL DEVICE, OPHTHALMIC LENS AND DEVICE FOR CORRECTING LONG-SIGHTEDNESS

(75) Inventors: Juan Carlos Dursteler López, Barcelona (ES); Enric Fontdecaba Baig, Barcelona (ES); Juan Esteban Palomar Burdeus, Barcelona (ES); María Sagrario Millán García-Varela, Barcelona (ES); Elisabeth Pérez Cabré, Barcelona (ES); Joaquín Otón Pérez, Barcelona (ES)

(73) Assignee: Indo Internacional, S.A., Sant Cugat del Valles (Barcelona) (ES)

( * ) Notice: Subject to any disclaimer, the term of this patent is extended or adjusted under 35 U.S.C. 154(b) by 143 days.

(21) Appl. No.: 12/304,973

(22) PCT Filed: Jun. 14, 2007

(86) PCT No.: PCT/ES2007/070116
§ 371 (c)(1),
(2), (4) Date: Jan. 26, 2009

(87) PCT Pub. No.: WO2007/147923
PCT Pub. Date: Dec. 27, 2007

(65) Prior Publication Data
US 2009/0201464 A1    Aug. 13, 2009

(30) Foreign Application Priority Data

Jun. 15, 2006 (ES) .................................. 200601678

(51) Int. Cl.
*G02B 26/00* (2006.01)
(52) U.S. Cl. ........................................ 359/237; 359/290

(58) Field of Classification Search .................. 359/237
See application file for complete search history.

(56) References Cited

U.S. PATENT DOCUMENTS 4,601,545 A    7/1986 Kern
(Continued)

FOREIGN PATENT DOCUMENTS

EP    0257675 A1    3/1988
(Continued)

OTHER PUBLICATIONS

Marquez et al., Achromatic diffractive lens written onto a liquid crystal display, Optics Letters, Feb. 1, 2006, vol. 31, No. 3, pp. 392-394.
(Continued)

*Primary Examiner* — Ricky Mack
*Assistant Examiner* — James Jones
(74) *Attorney, Agent, or Firm* — Peter B. Scull; K M Kalan; Berenbaum Weinshienk PC

(57) ABSTRACT

Optical device that comprises a spatial light modulator and a spectral filter that normally comprise several parts, such that each part of the filter (V; R; A; L) corresponds to at least one part of the modulator. The spectral filter is superimposed to the spatial light modulator such that the transmittance of each part of the filter is coordinated with the phase offset introduced by the corresponding part of the modulator. In one embodiment, the spatial light modulator is a programmable liquid-crystal device. The invention presents several ways in which to coordinate the transmittance of each part of the spectral filter with the programmed time variation of the phase offset introduced by each part of the spatial light modulator, such that each part of the latter receives light at a spectrally filtered wavelength and focuses it in the same plane.

19 Claims, 2 Drawing Sheets

U.S. PATENT DOCUMENTS 7,227,687 B1 * 6/2007 Trisnadi et al. .............. 359/559
2003/0219057 A1 * 11/2003 Govorkov et al. .............. 372/57

FOREIGN PATENT DOCUMENTS

| EP | 0446949 A1 | 9/1991 |
| JP | 2007057848 A | 8/2007 |
| WO | WO8505466 A1 | 12/1985 |

OTHER PUBLICATIONS

Liquid Crystals Ease Bifocal Strain, Optics & Laser Europe, the European Magazine for Photonics Professionals, Breault Research, May 2006, Issue 139, p. 11.
International Search Report for PCT/ES2007/070116, Oct. 15, 2007.
Written Opinion of the International Searching Authority for PCT/ES2007/070116, Oct. 15, 2007.

* cited by examiner

OPTICAL DEVICE, OPHTHALMIC LENS AND DEVICE FOR CORRECTING LONG-SIGHTEDNESS

The present invention is related to an optical device which comprises a spatial light modulator comprising at least one part that introduces a phase offset in a light wavefront, to an ophthalmic lens and to a device for correcting presbyopia.

The optical device, the ophthalmic lens and the device for correcting presbyopia preferably include diffractive elements.

BACKGROUND ART

A lens acts by bending the light wavefront falling thereon, i.e., the light beam coming out of the lens exhibits a phase offset, different from point to point of the lens surface, with respect to the incoming light beam to the lens; generally speaking, this happens because of the refraction of light on the surfaces of the lens, which depends both on the refraction index of the material and on the geometry of the lens surfaces. Thus, these both parameters can be acted upon in order to achieve a desired wavefront.

An example of a lens having a variable geometry surface is the classical Fresnel lens, which is an aggregate of differently shaped annuli from which the redundant thickness causing a phase offset multiple of $2\pi$ has been removed.

Another example of a lens presenting a variable refraction is a progressive ophthalmic lens, in which the power varies spatially across the lens surface. This is achieved by varying the refraction index or the curvature of the lens surfaces on each point.

In these examples the phase offset is different in different portions of the lens, i.e., the focal length presents a spatial variation across the lens. But it would be also interesting to obtain a lens having a focal length which varies with time. This idea leads to the concept of a programmable lens, which could be defined as a lens the focal length of which can be made to vary with time in a controlled manner. More generally, in a programmable lens the phase offset varies not only spatially across the lens surface but it can be made to vary with time too.

Generally speaking, lenses belong to a kind of optical devices named Spatial Light Modulators, or SLM, although the term SLM is normally applied to electro-optical devices. The modulation referred to can be an amplitude modulation or a phase modulation, though the present invention relates mainly to phase modulators.

The surface of an electro-optical SLM (in the following simply termed SLM) can be divided in portions that may independently adjust or modulate the amplitude or the phase of a light beam falling onto them; said portions are controlled by electrodes. Such a SLM can thus be suitable to work as a programmable lens.

An SLM can modulate the light by reflection or by transmission. For ophthalmic lenses it is, in principle, more convenient a transmission design, but a reflection device could also be interestingly applied to ophthalmic lenses.

One of the SLMs most useful in order to vary the focal length of the lens is the nematic liquid crystal display device (LCD or N-LCD). A LCD comprises a matrix of small cells or pixels of liquid crystal, each pixel having electrodes that allow to modify the optical behaviour of the liquid crystal housed in the cell constituting the pixel by applying a voltage. These modifications result in variations of the optical path that cause a phase offset which is equivalent to that caused by the variations of the refraction index or the curvature in conventional refractive lenses. By using such a device, and by generating a phase distribution that is equivalent to a conventional lens (mono-focal, bi-focal, progressive, ... ), a so called diffractive lens is obtained.

In diffractive optics, in contrast to refractive optics, it is not enough to represent the light by straight rays, but diffraction phenomena related to the wave nature of light are to be taken into account.

A drawback of diffractive lenses is that a change in the wavelength of the incoming light results in a change of the focal length, more acutely than with refractive lenses. This means that when light is not monochromatic, or almost monochromatic, then the image shows an important aberration, called chromatic aberration. This aberration becomes apparent in that the lens has a different power for any wavelength.

Said chromatic aberration can be classified as longitudinal and transversal. Longitudinal chromatic aberration is related to the fact that the lens focalizes on different planes along the revolution axis of the lens depending on the wavelength. But even if the focal plane is the same for all wavelengths (or at least for the considered wavelengths), it may happen that the intensity distribution delivered by the optical system on the image plane depends on the wavelength. It is then said that the systems presents a transversal chromatic aberration, which becomes apparent in an iridescence on the image.

Patent U.S. Pat. No. 4,601,545 discloses a variable power lens comprising a LCD controlled by a plurality of electric potentials in the form of an addressable matrix, in order to provide a gradient for the refraction index of the lens. In operation, the magnification of an image varies with the gradient of the electric field applied upon the aperture of the lens, and the power of the lens varies by varying the refraction index of the LCD. This document does not mention any correction of the chromatic aberration.

The paper "Achromatic diffractive lens written onto a liquid cristal display" (Márquez et al., OPTICS LETTERS, Vol. 31, No. 3, Feb. 1, 2006), discloses a programmable diffractive lens having the same focal length for several wavelengths simultaneously. Said lens is not designed for ophthalmic applications and with it the wavelength is not selected by means of spectral filters, whereby multiple focalizations are obtained on different planes and the chromatic aberration is not compensated.

A prototype of a programmable lens has recently been developed in the University of Arizona, said prototype being based on an LCD controlled by some electrodes arranged as concentric annuli. Such a device can only reproduce mono-focal or bi-focal lenses and does not compensate chromatic aberration. An initial description of the device can be found in "Optics & laser Europe" May 2006, Issue 139, page 11.

SUMMARY OF THE INVENTION

It is an object of the present invention to provide a diffractive optical device, having a spatial light modulator, able to act as a programmable lens the chromatic aberration of which is substantially reduced.

According to an aspect of the invention, the optical device comprises a spectral filter comprising at least one filtering part corresponding to said at least one part of the spatial light modulator, the transmittance of said spectral filter being selected according to the phase offset introduced in the wavefront by said at least one part of the spatial light modulator.

Preferably, the spatial light modulator and the spectral filter comprise several parts, whereby each part of the latter acts as a selective spectral filter and corresponds to at least one part of the former, the spectral filter being superimposed to the spatial light modulator, so that the phase offset of each part of the spatial light modulator is a function of the transmittance of the corresponding part of the spectral filter.

That each part of the spectral filter selects a wavelength means that the bandwidth of said filter is centred on said wavelength. Thus, each part of the spatial light modulator can receive light of mainly one determined wavelength, thanks to the corresponding filtering provided by the spectral filter. The spatial light modulator can be configured to the end that each part thereof focalizes the filtered light it receives on the same plane, so that this is the focal plane for the broadband light falling on the optical device, whereby the longitudinal chromatic aberration can be eliminated.

Preferably, the optical properties of each part of the spatial light modulator related to the phase offset introduced by said part of the spatial light modulator are programmable. In this way, an optical device the power of which can be controllably varied with time can be obtained.

Advantageously, the spatial light modulator is a liquid crystal device. LCD devices admit an easy and versatile programming.

In an embodiment, the spatial light modulator comprises a mosaic structure in which each part of the mosaic introduces a phase offset optimized to one wavelength. The ensemble of the parts of the mosaic associated to the same wavelength acts as a sublens having the desired power for said wavelength, whereby the resulting mosaic is a multiplexing of all the sublenses designed for different wavelengths.

Advantageously, the spectral filter presents a mosaic structure equivalent to that of the spatial light modulator, the transmittance of each part of the spectral filter being such that the filtering wavelength in said part matches the wavelength established for the corresponding part of the spatial light modulator. That is, upon establishing the suitable correspondence between the functionality of the modulator parts and the filter parts, the optical device according to the invention manages to substantially eliminate the longitudinal chromatic aberration, in this case by means of a spatial integration of the modulator and the filter.

Preferably, the mosaic structure of the spatial light modulator and the spectral filter is a pixel structure.

In an embodiment, the modulator surface is divided in circular sectors, each of which is optimized for a different wavelength, and the spectral filter exhibits the same structure divided in circular sectors of the spatial light modulator.

Advantageously, the spectral filter rotates synchronized with the programming of the spatial light modulator, so that the wavelength established for a given sector of the spatial light modulator and the wavelength of the corresponding sector of the spectral filter are substantially coincidental at all times. Thus, like before, the correspondence between the modulator and the filter solves the longitudinal chromatic aberration, though now through a spatial/temporal integration.

In an embodiment, the spectral filter selects one single wavelength and the whole surface of the spatial light modulator is optimized for this same wavelength. Advantageously, the spectral filter is tunable and programmable.

Preferably, when in operation, the transmittance of the spectral filter is varied, and the phase distribution of the spatial light modulator optimized for said wavelength is varied synchronously with said transmittance. This system also eliminates, by means now of a temporal integration, the longitudinal chromatic aberration.

In order to eliminate the transversal chromatic distribution, in an embodiment the energy distribution function on the focalization plane is substantially the same for all the wavelengths selected by the compound spectral filter, whereby the chromatic aberration of the optical diffractive components programmed in the device is compensated, and the spectral filter exhibits a different transmittance for different wavelengths, so that the central maxima may have the same value.

Preferably, the spatial light modulator is a phase Fresnel lens.

According to another aspect of the invention, an ophthalmic lens comprises an optical device according to any of the preceding specifications.

According to another aspect of the invention, a device for correcting presbyopia comprises an ophthalmic lens according to the previous paragraph and a telemetry system.

BRIEF DESCRIPTION OF THE DRAWINGS

Some embodiment of the present invention will be described in the following, only by way of non-limiting example, with reference to the appended drawings, in which.

DESCRIPTION OF PARTICULAR EMBODIMENTS

An optical device according to the invention comprises a lens (or, in general, a spatial light modulator, SLM) and a spectral filter and has the objective of providing an image that avoids the chromatic aberration typical of diffractive lenses. Such a device can be applied to various situations, like for instance ophthalmic optics, photography, holography or the generation of diffractive optical devices, both static and dynamic.

In several embodiments a programmable lens is provided, said lens comprising a SLM having at least one LCD.

A spatial modulator formed by a display or liquid crystal comprises a thin layer of liquid crystal sandwiched between two parallel glass plates. Such a device arises from the electro-optical ability of the liquid crystal, which reacts to an electric voltage by changing its optical properties, e.g. its refraction index. The voltage is applied across some transparent electrodes arranged on the liquid crystal surface and forming part of a structure that can be made of pixels, or else can have any pre-established design.

Thanks to the ability of varying the phase offset induced in the wavefront by varying the voltage, such a device can work as a lens if the voltage distribution causes a variation in the wavefront that is equivalent to the variation caused by the refraction index distribution on a conventional lens. The behaviour of a conventional lens could thus be reproduced by such a device if it allowed to obtain any variation in the wavefront. However, the modulators based on liquid crystal displays exhibit a limited phase modulation range. This leads to use a phase variation having a profile like that of a Fresnel lens, which is named a phase Fresnel lens. Such a profile presents discontinuities, and these discontinuities are the main responsible for the chromatic aberration that these diffractive lenses exhibit.

Figure 1:
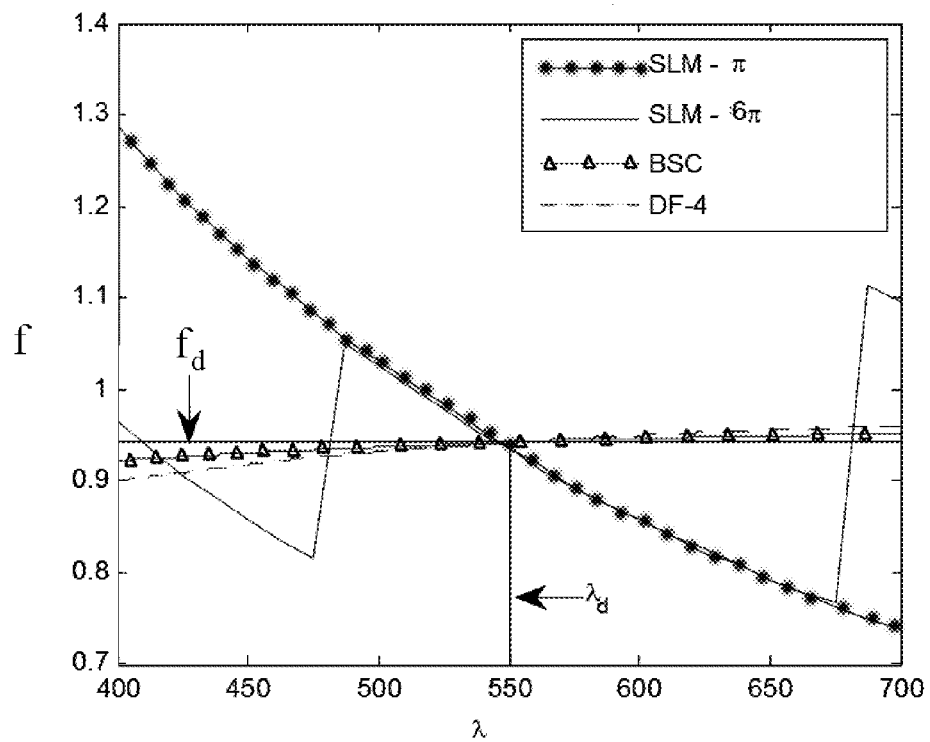
FIG. 1 is a graph plotting the variation of the focal length (f) of 4 lenses, two refractive ones and two diffractive ones, with respect to the wavelength ($\lambda$)

FIG. 1 shows the longitudinal chromatic aberration of two lenses generated in a liquid crystal display with two possible phase modulation ranges, π y 6π, and designed for exhibiting a focal length (f) of 0.94 m for a wavelength (λ) of 550 nm. FIG. 1 also shows the variation of power with the wavelength for two conventional lenses made of materials commonly used in ophthalmic optics (BSC and DF-4). It can be seen that, even with the modulator of 6π, the chromatic aberration is much greater in the LCD lenses than in conventional lenses. The commercially available LCD modulators exhibit a phase modulation range of at most 3π, whereby its behaviour would be in a level intermediate between the two shown modulators.

Several embodiments intended to solve the problem of chromatic aberration in diffractive lenses are explained below.

An embodiment employs a modulator in which the liquid crystal surface is divided into a pre-established mosaic structure, in which each part is calculated so that the light of a determined wavelength may focalize on the desired focal plane. This relationship between one part of the mosaic (or, better said, the phase offset induced by it) and a determined wavelength will be referred to as the "optimization" of said part for that wavelength.

The ensemble of the parts associated to the same wavelength behaviours like a sublens having the desired power for said wavelength, the resulting mosaic being a multiplexing of all the sublenses designed for different wavelengths.

Since each part of the modulator is optimized for one wavelength, it will exhibit a chromatic aberration with any other wavelength. To solve this problem a compound spectral filter is placed superimposed to the modulator, said filter having a mosaic structure equivalent to that of the modulator. The filter is so designed that the filtered wavelength matches the wavelength intended for the corresponding part of the modulator. Thus, each part of the modulator will only receive light with the wavelength said part is optimized for, and, consequently, no part will produce any significant chromatic aberration. Each part or element of the compound spectral filter transmits the maximum light centred in a determined wavelength.

Figure 2A:
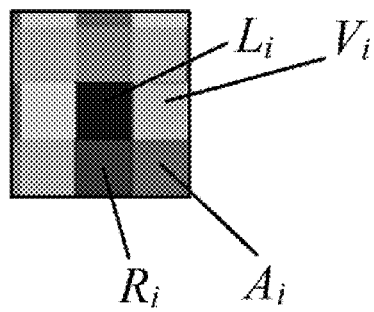
FIG. 2a is an enlargement of a detail of FIG. 2.
Figure 2:
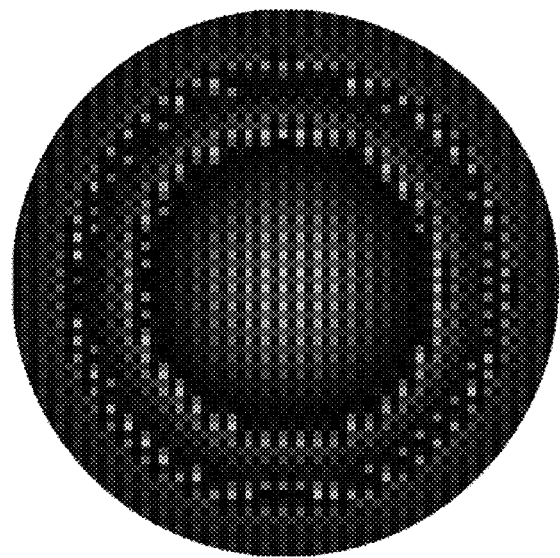
FIG. 2 shows a modulator in the form of a mosaic.

FIG. 2 shows a modulator with a mosaic structure made of pixels and optimized for 4 wavelengths. The colour of each part indicates the wavelength for which said part is optimized. The spectral filter will then exhibit the same pixel structure as the mosaic. FIG. 2a shows pixels of four basic colours: red ($R_i$), blue ($A_i$), green ($V_i$) and violet ($L_i$); the intensity of each part represents the phase offset programmed in said part: the subindex "i" for the colors, red, blue, green and violet, represents different phase offset levels.

In another embodiment, the surface of the modulator is decomposed in circular sectors, each of which is optimized for a different wavelength. A spectral filter having the same circular sector structure is superimposed to the modulator in order to minimize the chromatic aberration. Unless the previous embodiment, in which the parts optimized for one wavelength are distributed across the whole modulator surface, in this embodiment they are confined in a single region.

In order to invest the focalized energy distribution with a circular symmetry, the filter is rotated synchronously with the programming of the modulator, so that the wavelength established for a given sector of the modulator matches that of the corresponding sector of the filter. The rotation period must be shorter than the time to integrate the image acquisition system, so that the multiplexing of the images for the different wavelengths can take place, allowing the device to behave like a lens free of chromatic aberration.

Figure 3:
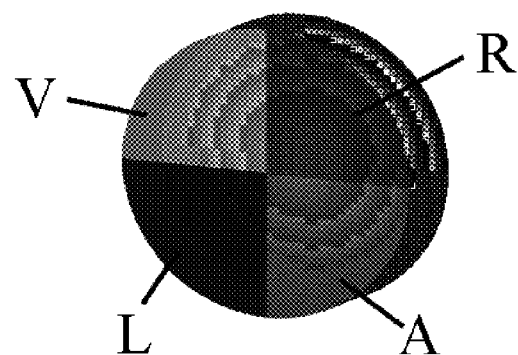
FIG. 3 shows a spectral filter made of circular sectors superimposed to a modulator having the same configuration.

FIG. 3 shows, in the rear plane, a modulator with a pixel structure divided in four circular sectors, each optimized for the same wavelength of the corresponding sector of the superimposed filter (green V, red R, blue A and violet L). The filter rotates with time and, although the modulator is static, the voltage distribution changes with time, so that the region of the modulator associated to a corresponding region of the filter is designed for the same wavelength.

In the previous embodiments the filter is not variable, but other embodiments comprise a tunable spectral filter. In one of these embodiments, the whole modulator surface is optimized for a single wavelength and the filter is programmed for this wavelength. This provides a lens that is optimal for this wavelength. If the device is to be used in an illumination system with a broad spectre, for example white light, a variation of the wavelength of the lens programmed in the modulator is synchronized with the wavelength tuned in the filter. A major or a lesser number of wavelengths distributed in the modulator will be chosen in function of the requirements of the application, and said wavelengths will be presented in a time shorter than the integrating time in the image acquisition system.

Figure 4:
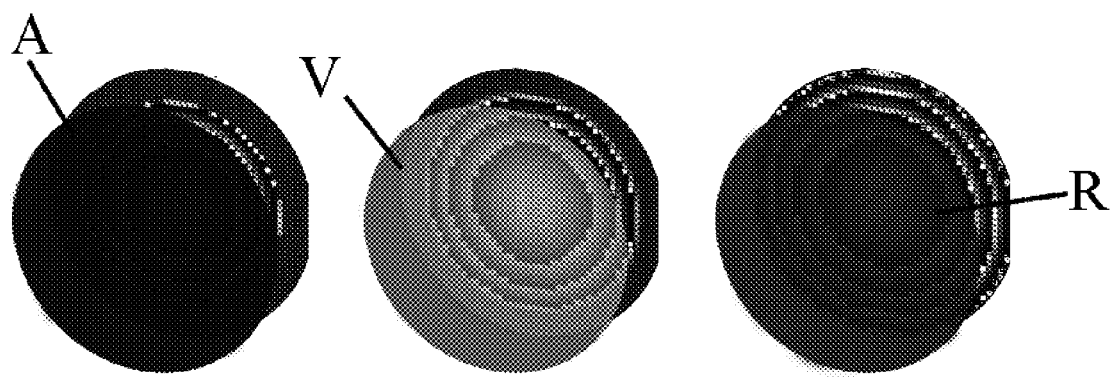
FIG. 4 shows a spectral filter and a modulator tuned differently in three different instants.

FIG. 4 shows the configuration of such a device in three different instants, in which the wavelength of the lens programmed in the modulator corresponds to the wavelength tuned in the filter in that instant (blue A, green V and red R).

Any of these embodiments solves the problem of the longitudinal chromatic aberration of phase Fresnel lenses generated by the modulators. In truth, the spectral filter is the one that corrects the longitudinal chromatic aberration, but in these embodiments it is also possible to correct the transversal chromatic aberration.

To do so one has to take into account the transfer function of a circular aperture lens:

$$I_i(u, v) = \left(\tau_i(\Delta\lambda)\pi \frac{R_i^2}{\lambda_i f}\right)^2 \left[2 \frac{J_1\left(2\pi \frac{R_i}{\lambda_i f}(u^2 + v^2)^{1/2}\right)}{2\pi \frac{R_i}{\lambda_i f}(u^2 + v^2)^{1/2}}\right]^2,$$

where $I_i$ is the intensity distribution in the image plane of coordinates (u,v) for each wavelength $\lambda_i$, $\tau_i$ is the transmittance of the spectral filter for each wavelength, f is the designed focal length of the length, and $R_i$ is the radius of lens designed in the modulator for each wavelength. Similar mathematical analyses can be made for other apertures of the lens having a different geometry, said analyses giving place to other functions for describing the energy distribution in the focalization plane.

In order to eliminate the transversal chromatic aberration, the intensity distribution in the image plane should be the same for any wavelength. If it is imposed for the normalized Bessel function $J_i$ (the quantity contained in the brackets, which represents the energy distribution in the focalization plane), that corresponds to the circular aperture of the device, to have the same width as the central lobe for any wavelength, then it is achieved for the intensity distributions to have maxima and minima in the same positions, although not with the same value. This can be compensated by applying a different transmittance to the spectral filter for each wavelength.

Figure 5:
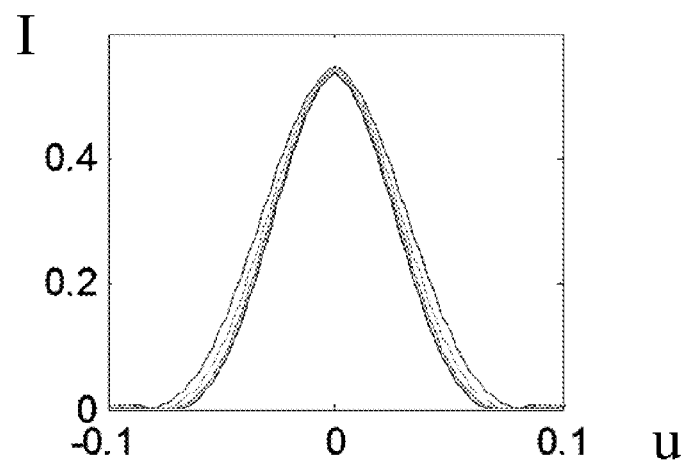
FIG. 5 is a graph plotting the variation of the image intensity in a transversal direction on the focal plane.

Another solution to the transversal chromatic aberration is obtained by imposing for the value of the maximum central to be the same for any wavelength. This does not guarantee for the rest of maxima and minima to be in the same position for any wavelength. However, the calculations show (see FIG. 5)

that the differences of position of the secondary maxima and minima do not differ much in the range of the visible spectrum.

Although the described device can be applied to numerous fields, as previously remarked, two applications in the field of ophthalmic optics can be highlighted. On one hand, the combination of the device with a manual control for selecting different configurations would allow to change the power of the lens at will. On the other hand, these lenses could be employed for correcting presbyopia. A presbyopic person needs a lens with a different power depending on the distance to the object to visualize. The described device can be combined with a telemetry system to determine the distance to the object, and then it can apply the voltage distribution necessary to generate a lens having the power required by the user according to her/his visual condition.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

What is claimed is:

1. An optical device comprising a spatial light modulator which includes at least one part that introduces a phase offset in a light wavefront, the optical device also comprising a spectral filter comprising at least one filtering part corresponding to said at least one part of the spatial light modulator, the transmittance of said spectral filter being selected according to the phase offset introduced in the wavefront by said at least one part of the spatial light modulator, wherein said spectral filter selects a wavelength, wherein the spatial light modulator and the spectral filter comprise several parts, whereby each part of the latter acts as a selective spectral filter and corresponds to at least one part of the former, the spectral filter being superimposed to the spatial light modulator, so that the phase offset of each part of the spatial light modulator is a function of the transmittance of the corresponding part of the spectral filter.

2. An optical device according to claim 1, wherein the optical properties of each part of the spatial light modulator related to the phase offset introduced by said part of the spatial light modulator are programmable.

3. An optical device according to claim 2, wherein the spatial light modulator is a liquid crystal device.

4. An optical device according to claim 1, wherein the spatial light modulator comprises a mosaic structure in which each part of the mosaic introduces a phase offset optimized to focalize the light of one wavelength.

5. An optical device according to claim 4, wherein the ensemble of the parts of the mosaic associated to the same wavelength acts as a sublens having the desired power for said wavelength, whereby the resulting mosaic is a multiplexing of all the sublenses designed for different wavelengths.

6. An optical device according to claim 4, wherein the spectral filter presents a mosaic structure equivalent to that of the spatial light modulator, the transmittance of each part of the spectral filter being such that the filtering wavelength in said part matches the wavelength established for the corresponding part of the spatial light modulator.

7. An optical device according to claim 4, wherein the mosaic structure of the spatial light modulator is a pixel structure.

8. An optical device according to claim 7, wherein the mosaic structure of the spectral filter is a pixel structure.

9. An optical device according to claim 2, wherein the modulator surface is divided in circular sectors, each of which is optimized for a different wavelength.

10. An optical device according to claim 9, wherein the spectral filter exhibits the same structure divided in circular sectors of the spatial light modulator.

11. An optical device according to claim 10, wherein the spectral filter rotates synchronized with the programming of the spatial light modulator, so that the wavelength established for a given sector of the spatial light modulator and the wavelength of the corresponding sector of the spectral filter are substantially coincidental at all times.

12. An optical device according to claim 2, wherein the spectral filter selects one single wavelength and the whole surface of the spatial light modulator is optimized for this same wavelength.

13. An optical device according to claim 12, wherein the spectral filter is tunable and programmable.

14. An optical device according to claim 12, wherein, when in operation, the transmittance of the spectral filter is varied, and the phase distribution of the spatial light modulator optimized for said wavelength is varied synchronously with said transmittance.

15. An optical device according to claim 1, wherein the energy distribution function on the focalization plane is substantially the same for all the wavelengths selected by the compound spectral filter, whereby the chromatic aberration of the optical diffractive components programmed in the device is compensated.

16. An optical device according to claim 15, wherein the spectral filter exhibits a different transmittance for different wavelengths.

17. An optical device according to claim 1, wherein the spatial light modulator is a phase Fresnel lens.

18. An ophthalmic lens comprising an optical device according to claim 1 wherein said optical device is an ophthalmic lens.

19. A device for correcting presbyopia comprising an ophthalmic lens according to claim 18 and a telemetry system.

* * * * *